Dec. 26, 1967 I. PROPERZI 3,360,211
MACHINES FOR COILING CONTINUOUSLY SUPPLIED TAPE
Filed May 5, 1964 6 Sheets-Sheet 1

INVENTOR.
ILARIO PROPERZI
BY Mueller & Aichele
Attys.

MACHINES FOR COILING CONTINUOUSLY SUPPLIED TAPE

Filed May 5, 1964 6 Sheets-Sheet 2

INVENTOR.
ILARIO PROPERZI
BY Mueller & Aichele

Attys.

Dec. 26, 1967 I. PROPERZI 3,360,211

MACHINES FOR COILING CONTINUOUSLY SUPPLIED TAPE

Filed May 5, 1964 6 Sheets-Sheet 3

INVENTOR.
ILARIO PROPERZI
BY Mueller & Aichele

Attys.

INVENTOR.
ILARIO PROPERZI
BY Mueller & Aichele
Attys.

INVENTOR.
ILARIO PROPERZI
BY Mueller & Aichele
Attys.

Dec. 26, 1967 I. PROPERZI 3,360,211

MACHINES FOR COILING CONTINUOUSLY SUPPLIED TAPE

Filed May 5, 1964 6 Sheets-Sheet 6

INVENTOR.

ILARIO PROPERZI

BY Mueller & Aichele

Attys.

United States Patent Office 3,360,211
Patented Dec. 26, 1967

3,360,211

MACHINES FOR COILING CONTINUOUSLY SUPPLIED TAPE

Ilario Properzi, Via Cosimo del Fante 10, Milan, Italy
Filed May 5, 1964, Ser. No. 365,022
Claims priority, application Italy, May 11, 1963, 9,837/63, Patent 695,588
13 Claims. (Cl. 242—80)

The present invention concerns a machine adapted to perform the coiling of a tape, and in particular, of a metal tape leaving a continuous rolling mill.

The invention particularly relates to apparatuses apt to produce tape with continuity, such as continuous rolling mills producing metal tape for instance of aluminium; the main object of the present invention is to make it possible to coil a tape in such a way as to form coils of predetermined diameter with lengths of said tape, without having to interrupt, at the end of the formation of each coil, the issue of the tape from the apparatus that produces it (for instance from the rolling mill). The machine according to the present invention mainly comprises two rotatable drums supported by the framework, on which are coiled alternately lengths of tape, a guide member supported by a support movable on the framework, over which the tape passes while being directed to the one or to the other one of the drums, and means adapted to determine displacements of the support of said guide member in such a way that every time on a drum in rotation a coil of tape has attained a predetermined diameter, the position of the guide member is such as to determine a condition of tangency between the other drum and the length of tape comprised between the guide member and the coil, each of said drums carrying a shears adapted to cut the tape, at the point of tangency while clamping one end thereof, belonging to the arriving tape, against said drum, there being further provided means adapted to determine, when said condition of tangency occurs, the actuation of the shears carried by the drum tangent to the tape, and means adapted to determine, prior to the performance of the cutting of the tape by said shears carried by the drum tangent to said tape, the starting of the rotation of the drum in such a way that the latter attains a peripheral speed equal to the forwarding speed of the tape, whence, on having effected said cutting, while one end of the tape, belonging to the coil formed on the other drum, remains free and is, therefore, fixed to the coil, the other end of the tape remains constrained to the drum through the very shears that has effected said cutting and so there starts on the drum the coiling of the tape for the formation of a new coil, and there being provided means adapted to permit to draw off each coil from the drum on which it has formed, at the end of the formation of said coil.

In order to make more fully understood the characteristics and advantages of the machine according to the present invention, now there will be described a non-limiting example of embodiment of the machine according to said invention, with reference to the accompanying diagrammatical drawing in which:

FIGURE 1 shows the machine in elevation, seen frontally, in a determined working stage;

FIGURE 2, analogous to FIGURE 1, shows the machine in a different working stage;

Figure 7:
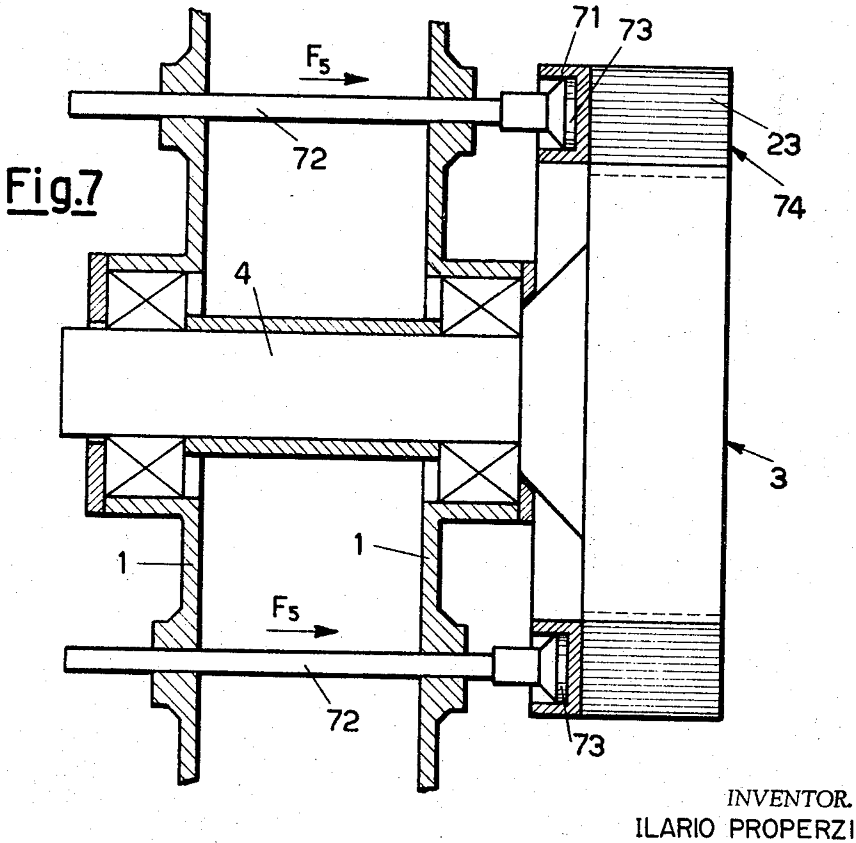
FIGURE 7 is a schematic cross section taken along the axis of one drum and showing a device for the expulsion of the coil thereon; for every drum there is provided such a device.
Figure 5:
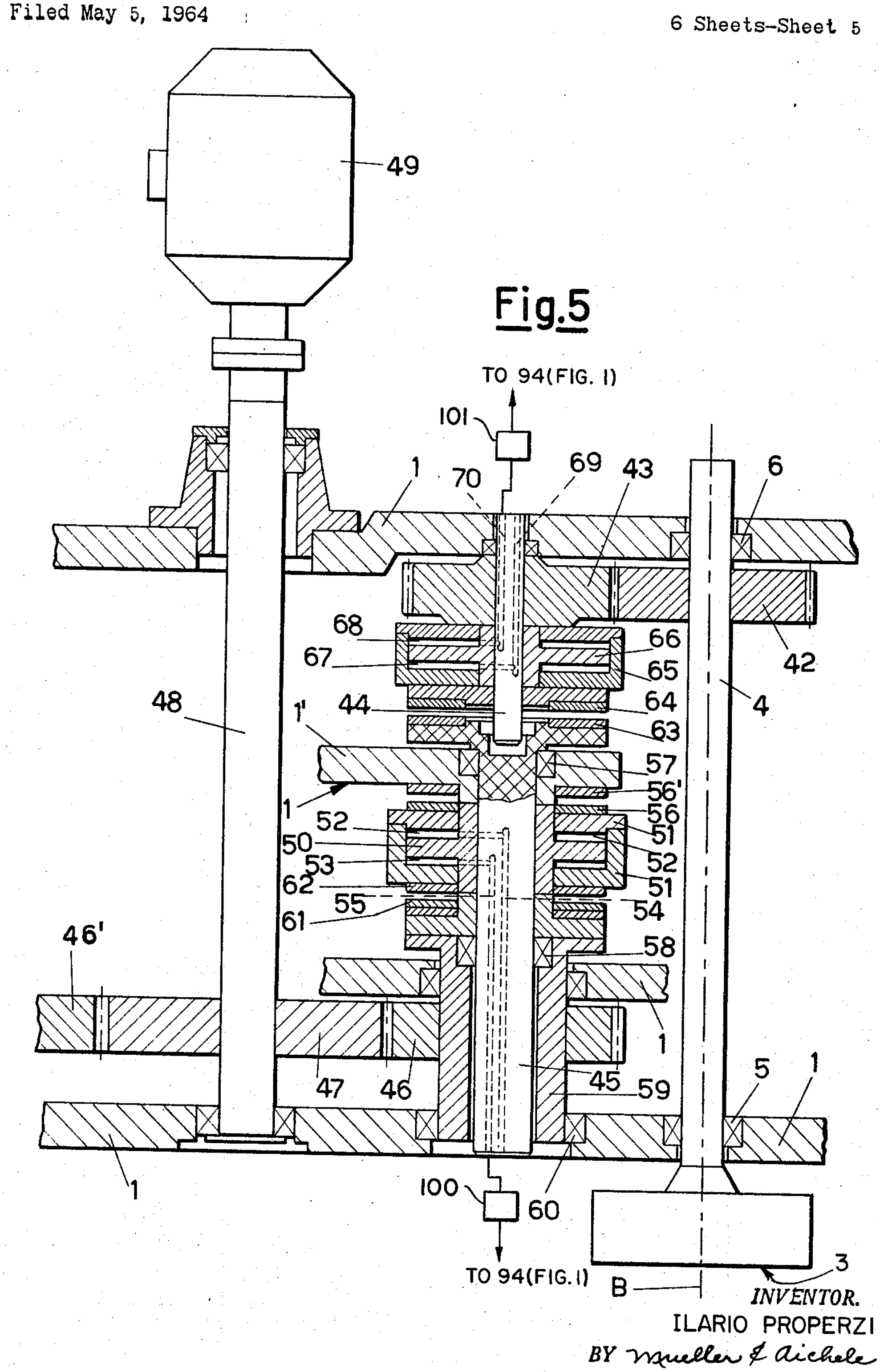
FIGURE 5 is a schematic cross section taken along line V—V of FIG. 1 and showing the means for controlling the rotation of each drum.

The machine comprises a fixed framework 1 supporting the various members, such as the coiling drums 2 and 3 adapted to rotate respectively around the axes A and B (geometrical axes) fixed with the framework; on said drums, as will be set forth hereinafter, there is coiled the tape 23 coming from a continuous rolling mill. Each drum 2 and 3 is fixed at the end of a respective shaft 4 (visible in FIGS. 3, 5 and 7) rotatable in the bearings 5 and 6 sustained by the framework 1; each one of said drums comprises a part rigid to said shaft 4 and a peripheral surface on which the tape is wound up; said surface is movable radially with respect to the shaft in such a way as to enable one to vary the external diameter of the drum, for reasons that will more fully clearly appear hereinafter.

Figure 3:
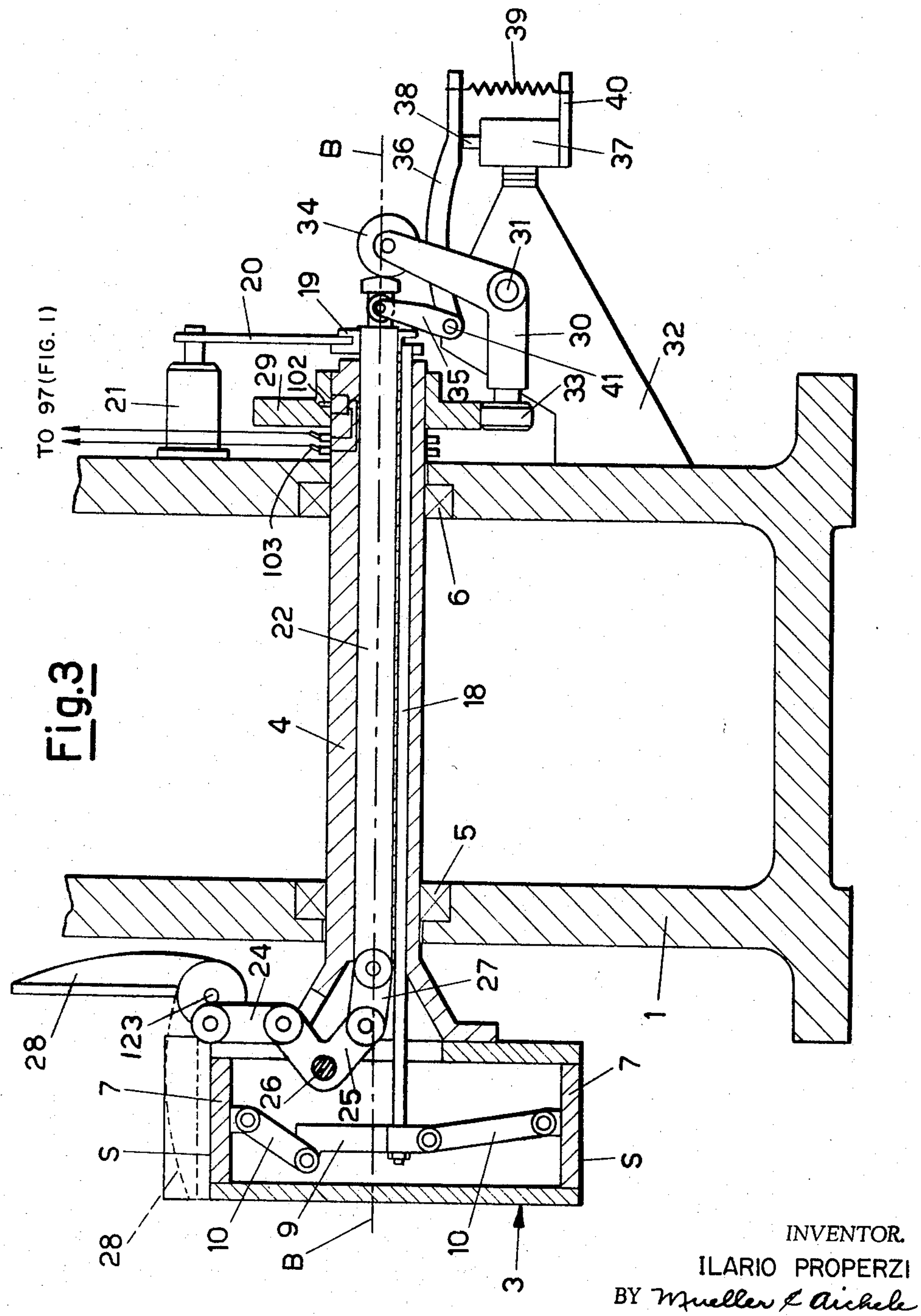
FIGURE 3 is a schematic cross section taken along the axis of one drum and illustrating the control of members forming part of the drum; elements equal to those shown in FIG. 3 are provided for the other drum.
Figure 6:
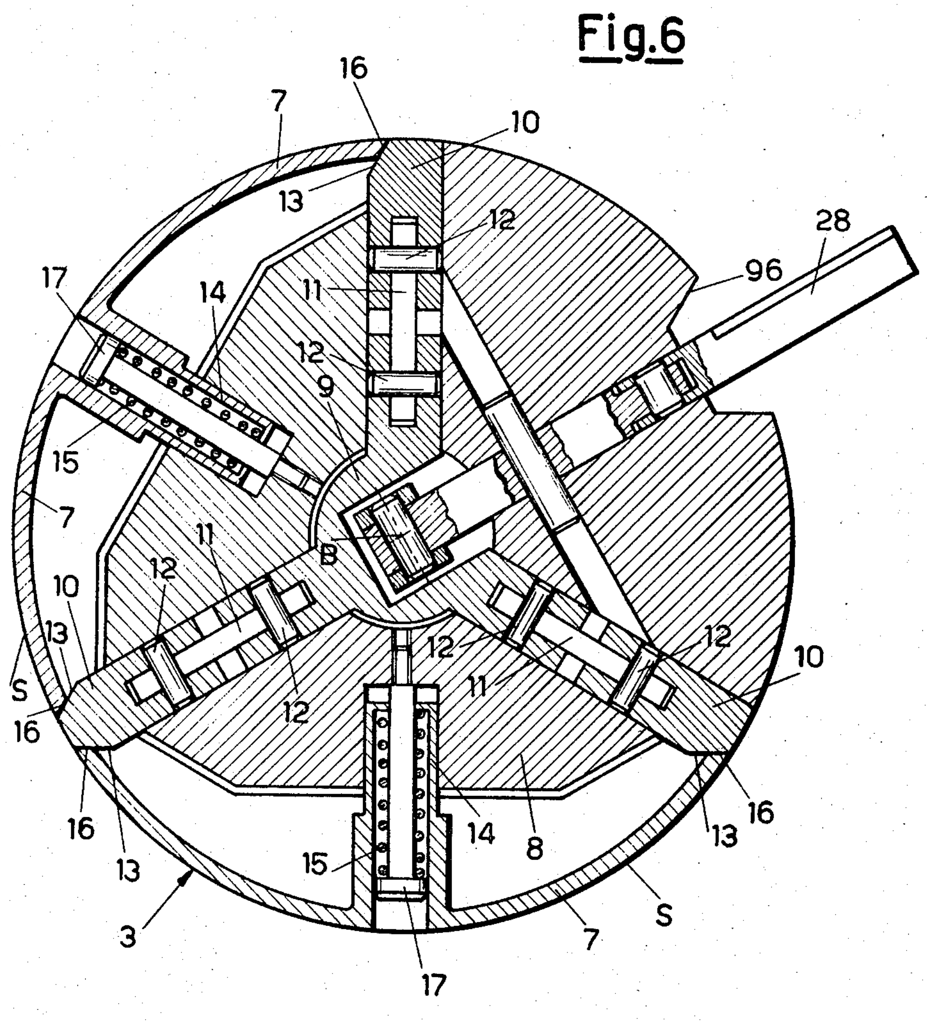
FIGURE 6 is a cross section taken along line VI—VI of FIG. 5, being drawn to an enlarged scale and showing the means for varying the diameter of said drum (the same members shown in FIG. 6 are equal in the two drums)

In FIG. 6 there is visible a section of a drum, for instance drum 3 (the other one is identical); as obtained by a plane normal to the axis of rotation; in said figure are visible the sectors 7, movable with respect to the part 8 rigid to the shaft in such a manner as to enable one to vary the diameter of the coiling surface S; each sector, with its own stem 14, is guided in the part 8; a spring 15, reacting between the stem 14 and a pin 17 rigid with the part 8, tends to cause the return of said stem into said part 8. An element 9 (see FIG. 6) movable with respect to the shaft 4 in the direction of the axis B, is hingedly connected, through the pins 11 and 12, with the arms 10 inclined with respect to the axis B (see FIG. 3) whence a displacement of the element 9 in one direction (towards the right if looking at FIG. 3) causes a displacement, towards the outside, of the ends of the arms 10 acting upon the sectors 7; said ends act with their inclined surfaces 13 (see FIG. 6) upon the ends, which too have an inclined surface 16, of the sectors 7, whence by said displacement the arms 10 determine a radial expansion of the sectors 7, thereby increasing the radius (distance from the axis B) of surface S. In FIG. 3, the members involved with the variation of the diameter of the surface S and the connections between said members, are not identical to the corresponding members and connections shown in FIG. 6: for instance, the arms 10 appear pivoted to the sectors 7. The representation of FIG. 3 however does not change in character the essential concepts expounded with reference to FIG. 6 and hence it has been given merely for the sake of greater clearness and simplicity. The contrary displacement of the element 9 (namely towards the left if looking at FIG. 3) permits a displacement of the sectors 7 in the direction in which the radius of the surface S diminishes, namely (see FIG. 6) the stems 14 penetrate more deeply into the seats of the part 8, by action of the springs 15. The control of the element 9 takes place through a rod 18, passing through a longitudinal bore in the shaft 4, which rod is fixed, by its two ends, respectively to the member 9 and to a member 19; this latter, which comprises a circular peripheral throat, is carried by the rod 22 (which is dealt with later on), can slide axially on the rod 22 and is rigid therewith during rotation; an arm 20 actuated by a motive member 21, penetrates into the throat of member 19 and serves to control the axial displacements of the rod 18, and, therefore, of the element 9. Each drum 2 and 3 comprises moreover a shears 28 adapted to cut the metal tape 23 and to clamp one end of said tape on the drum, to start the coiling of a length of tape comprising said end (as will be better explained hereinafter). The shears 28 (see FIG. 3) are pivoted at 23 on the part of the drum that is rigid with the shaft 4; an arm 24 is eccentrically pivoted at the same shears and at a lever 25 which in turn is pivoted in 26 at said part of the drum rigid with the shaft 4; the lever 25 is pivoted at an arm 27 pivoted on the rod 22. The lowering of the shears 28 (which goes from the position drafted in FIG. 3 to the horizontal position indicated by dotted lines in the same figure) is performed by axially displacing the lever 22 (towards the left, if looking at FIG. 3); for the control of the rod 22 there are provided means comprising a cam 29 freely mounted on the shaft 4 and a lever 30, pivoted at 31 on a support 32 rigid with the framework 1; said lever cooperates, through a small roll 33 carried by it, with the cam 29 and acts through a second small roll 34, which too is carried by it, on the rod 22.

There is further provided a device (one for each drum 2 and 3) adapted to maintain the rod 22 in the position (displaced towards the left, if looking at FIG. 3) in which the shears 28 is lowered. Said device comprises two arms 35 and 36 rigid with each other and pivoted at 41 to the support 32: the arm 35 is connected to the rod 22 in such a way as not to hinder the same in its rotation (which takes place together with the drum 2 or 3) and to rotate (towards the left, if looking at FIG. 3) when the rod 22 displaces itself (towards the left, if looking at said FIG. 3); if instead the arm 35 rotates towards the right (if looking at FIG. 3), the rod 22 is displaced to the right. The contact between the arm 35 and the rod is realized by means of a small roll pivoted to the very arm 35 and housed in an annular groove of the rod 22. A hydraulic cylinder 37, sustained by a support 40 fixed with the framework, is adapted to keep the arm 36 lifted by means of the piston 38 (thereby keeping the arm 35 displaced towards the left, if looking at FIG. 3 and, therefore, keeping the rod 22 also displaced towards the left). A spring 39 fixed to the arm 36 and to said support 40, pulling the arm 36 determines a rotation thereof (when the piston 38 so allows) thereby determining, through the arm 35, the return of the rod 22 towards the right (if looking at FIG. 3) and, therefore, the relifting of the shears 28. As said above, each drum 2 and 3 for coiling the tape 23 is carried by a respective shaft 4; for the control of the rotation of each drum (see FIG. 5), there are provided means comprising a gear 42 fitted onto the shaft 4, in engagement with a gear 43 fitted onto a spindle 44; the latter is sustained by the framework 1 and by a shaft 45 into which it penetrates and with respect to which it may have relative movement (of rotation); the shaft 45 is sustained at one end (through the bearing 57) by the wall 1' of the framework 1 and penetrates into the bearing 58 housed in a hollow shaft 59; the latter, sustained at one end by the framework 1 (through a bearing 60), surrounds the shaft 45, can rotate freely with respect thereto, and carries (fitted thereto) a gear 46 meshing with a gear 47 fitted onto a shaft 48 actuated by an electric motor 49; serving both the drums 2 and 3, that is to say, its gear 47, besides meshing with the gear 46 (corresponding to the drum 3) also meshes with an analogous gear 46' for the control of the drum 2. Between the shaft 59, connected to the shaft of the motor 49 and the shaft 44 (and also between the analogous shafts, not shown for the sake of simplicity, for the actuation of the drum 2) there are provided two friction clutches. One of said friction clutches comprises the two friction elements 61 and 62 which are rigid with the shaft 59 and with a body 51 (constituted by two parts rigid with each other) respectively; a body 50, to which the body 51 is rigid only in rotation but not axially, divides said body 51 into two sealed chambers 52 and 53 which are in communication with the conduits 54 and 55 respectively, which pass through the shaft 45; the body 50 is rigid with said shaft 45. Moreover there are provided hydraulic means (not represented for the sake of simplicity) which are adapted to send oil under pressure into the chambers 52 and 53 through said conduits.

Two elements 56 and 56', which are rigid respectively with the body 51 and with the fixed wall 1' of the framing, serve, when in contact with each other, to brake the body 51 and, therefore, the shaft 45. The other friction clutch comprises two elements 63 and 64 which are rigid respectively with the shaft 45 and with a body 65: this latter is rigid only in rotation with a body 66 that divides it into two chambers 67 and 68 which are sealed and are in communication respectively with two conduits 69 and 70 passing through the shaft 44; said conduits in turn are in communication with means (not represented for the sake of simplicity) that are adapted to send oil under pressure into the chambers 67 and 68; the body 66 is rigid with the shaft 44.

In correspondence with each drum there is also provided (see FIG. 7) a device for the ejection of coil 74 constituted by the tape that had been reeled up on the said drum; said device comprises an annular element 71 actuated through two rods 72 slidable axially in holes of the framework 1 and engaging with enlarged end portions 73 the element 71; it is possible to provide means of control by hand, or automatical control means, for pushing (in the direction of the arrows $F_5$ visible in FIG. 7) the element 71 in such a manner as to make the coil 74 slip off the drum 2 or 3.

Figure 4:
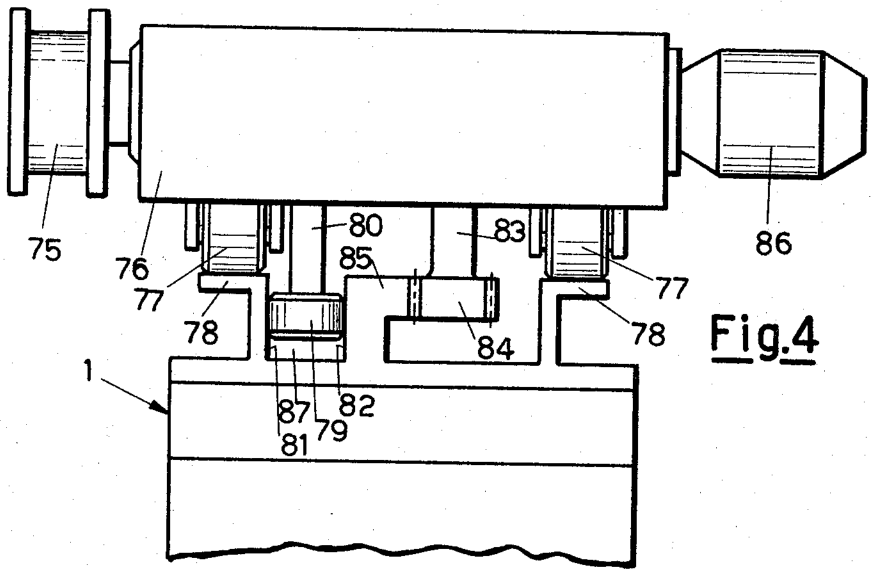
FIGURE 4 is a side view of a carriage carrying a guide member for the tape.

A guide pulley 75 for the tape 23 (see FIGS. 1, 2, 4) is sustained by a carriage 76 movable by means of the wheels 77, on the rectilinear tracks 78 (see FIG. 4); small rolls 79, carried by pins 80 with which the carriage is provided, slide in a rectilinear guide 87, in contact with the flat walls 81 and 82, thereby guiding said carriage which in this way can move in the direction of the arrow $F_1$ (marked in FIGS. 1 and 2) in one direction or in the opposed direction. The actuation of the carriage 76 is provided by a motor 86 (carried by said carriage), which drives a shaft 83 and a gear 84 meshing with a rectilinear rack 85 (parallel to the tracks 78 and to the guide 87). In correspondence with the drums 2 and 3 there are provided two respective sensing means comprising arms 88 and 89 pivoted at 90 and 91 on the framework 1 and carrying two respective rolls 92 and 93, each one of which is destined to contact, as will be seen hereinafter, with the tape 23 that is wound up on the corresponding drum; in correspondence with the two arms 88 and 89 there are provided two respective push-buttons 94 and 95, carried by the framework in fixed positions, to determine, upon action by said arms, the control of some members of the machine, as will be explained hereinafter. Operation of the above described machine is as follows. The metal tape 23, for instance of aluminum, coming continuously and at constant speed from a continuous rolling mill, has to be wound up in such a way as to form coils each of which is constituted by a length of tape cut off at its two ends from the remainder of the tape (the latter issues with continuity from the rolling mill); the reeling takes place alternately on the drums 2 and 3. Let us suppose for instance that the initial end of the tape issuing from the rolling mills is clamped to the drum 2 by means of the very shears 28 that retain in the closed position said end against the drum in the recess 96 thereof by folding the tape end and by clamping the same against surfaces of the recess 96 (the shears does not project from said recess, namely its space requirement is not beyond the external radius of the drum.) The shears 28 thus form combined shearing and clamping means. The tape 23 coming from the rolling mill according to the arrow $F_1$ and guided by the pulley 75, is wound up on the drum 2 rotating in the direction of the arrow $F_2$: in fact the motor 49 is supposed to be in action and in condition of transmission of movement of the two friction clutches described above, corresponding to said drum (oil under pressure in the chambers 53 and 67 and, therefore, transmission of movement from the element 61 to the element 62 and from the elements 63 to the elements 64). It should be noted that while the tape 23 is wound up on the drum 2, the increase of the diameter of the coil would increase its peripheral speed, and the tape would be wound up with higher speed; on the other hand, the tape in question issues at constant speed from the rolling mills whence an increase of peripheral linear speed of said coil is not possible: said peripheral speed is made to remain constant, by means of a slipping of friction clutches (which transmit the movement to the drum) or by other means, which are per se independent of the invention. During the formation of the coil 74 on the drum 2, the tape 23 in the rectilinear portion from the pulley 75 to the drum 2, does not touch the drum 3. On continuing the rotation of the drum 2 and, therefore, increasing the diameter of the coil being formed on said drum, at a certain time the coil 74 (on the drum 2) attains a certain diameter (that visible in FIG. 2). In that instant, for reasons that will better appear hereinafter, the carriage 76 carrying the pulley 75 finds itself in the position visible in FIG. 2 whence said rectilinear portion of the tape, indicated by M–N in FIG. 2, comes to be tangent at P to the drum 3 (see FIG. 2). It should be noted that while the coiling of the tape on the drum 2 is effected before reaching said condition of tangency at P of the tape 23 with the drum 3, the arm 88, kept at contact (for instance by a spring or other means) with the periphery of the coil 74 being formed, rotates in the direction of the arrow $F_4$ (see FIG. 2) owing to the increase of the diameter of said coil: at the time in which said condition of tangency of the tape with the drum 3 is reached, the arm 88 contacts the pushbutton 94. Until that time the drum 3 was standstill, not being in conditions of transmission by the respective friction clutches (those above described and illustrated in FIG. 5); the shears 28 of the drum 3 will be in the lifted position (position visible in FIG. 2, corresponding to the position of the shears 28 shown in FIG. 3). After the actuation of the push-button 94, the following movements take place:

(a) The drum 3 begins to rotate, and gradually increasing its speed it attains synchronism speed, that is it will then possess a peripheral speed equal to the forwarding speed of the tape 23 in such a way as not to have in practice any relative movement between the tape and the drum at the point P of tangency; this movement, as will be said hereinafter, is determined by the very push-button 94.

(b) The shears 28 begins to act, on the drum 3, by effect of a second push-button 97, at the time in which said synchronism speed is attained.

(c) Stoppage of the drum 2, by action of the operator or by means of a third push-button actuated by the arm 88.

Other movements, which take place after the starting of the action of the shears 28 of the drum 3 and after the stoppage of the drum 2, are:

(I) The beginning of the action of the above described device that determines a reduction of the diameter of the surface S of the drum 2;

(II) A displacement of the arm 88 (according to the arrow $F_4$) in such a way as not to hinder subsequently the ejector 71.

Figure 1:
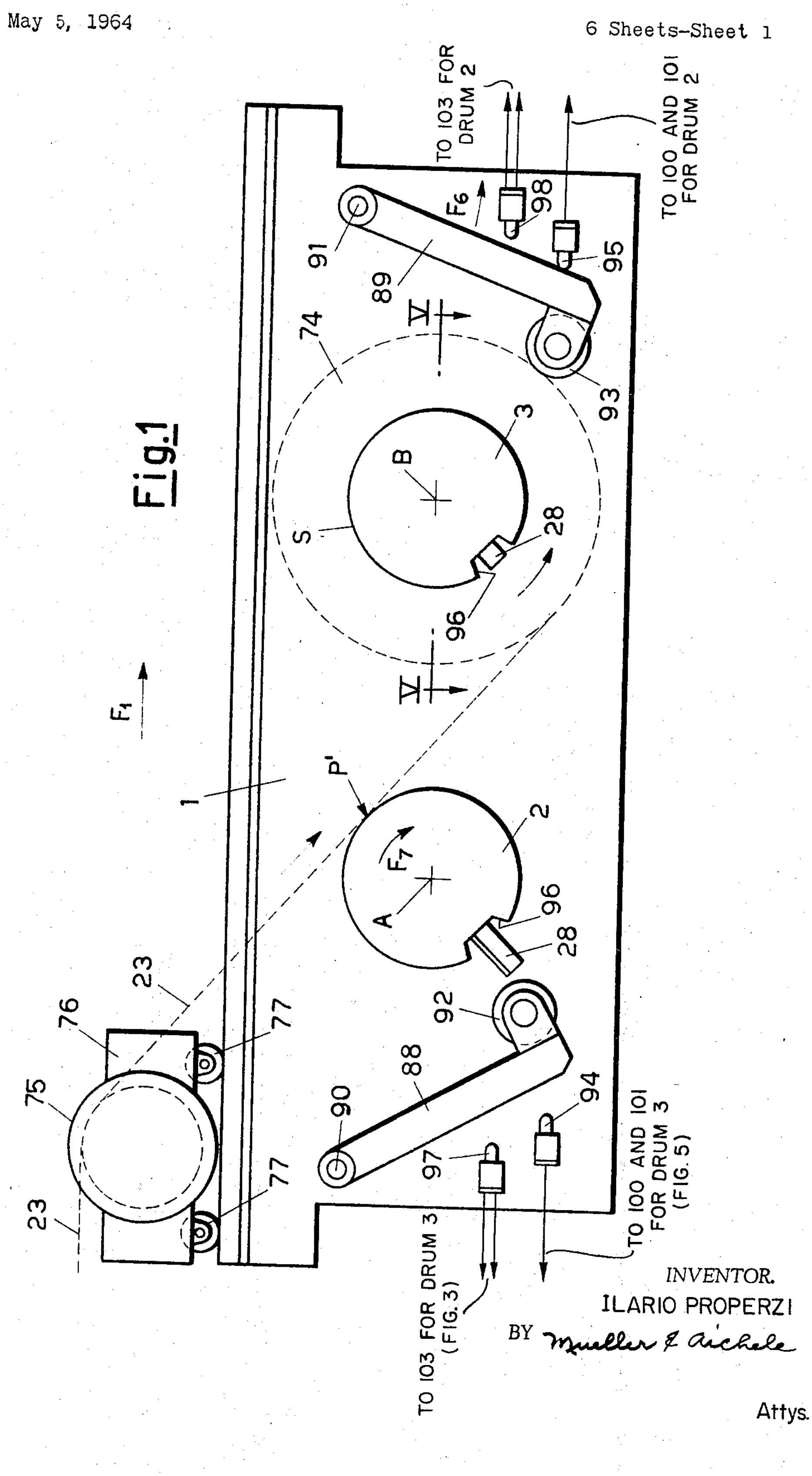
Figure 2:
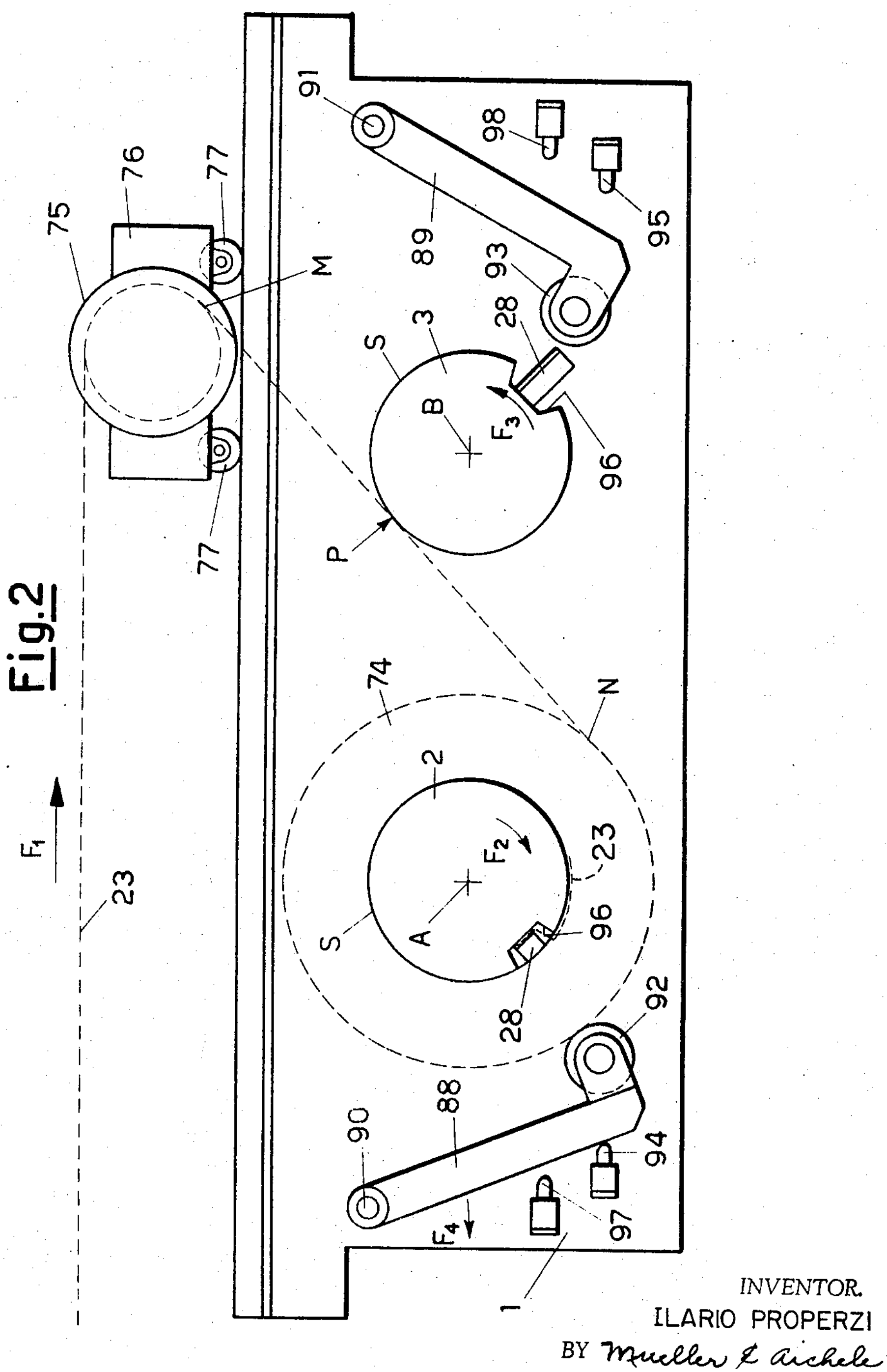

(III) The beginning of the action of the ejector 71 that draws the bobbin 74 off the drum 2;

(IV) A displacement of the carriage 76 from the position of FIG. 2 to the position of FIG. 1.

These latter movements (I, II, III, IV) may be controlled automatically, possibly by delaying devices, by effect of push-buttons actuated by the arm 88; they may of course be controlled by the operator who to that end acts upon special push-buttons or similar control members thereby actuating members which determine said movements.

In more detail, when the tangency condition at P has been attained, as shown in FIG. 2, the actuation of the push-button 94 by the arm 88 causes the conveying of oil into the chamber 53 for instance by actuation of a hydraulic device 100, a pump or the like, (corresponding to the drum 3, visible in FIG. 5), whereby there is determined the contact between the elements 61 and 62 (corresponding to the drum 3) with consequent transmission of movement from the shaft 59 to the shaft 45 of said drum 3 (the motor 49 is always supposed to be in action); then starts action of the other friction clutch by sending oil into the chamber 67 (visible in FIG. 5) for instance by actuation of a second hydraulic device 101 which may be actuated by push-button 94 over a time delay relay (not shown), whence there takes place a transmission of movement to the shaft 4 of the drum 3 which gradually begins to turn until attaining said speed of synchronism.

The shears 28 of the drum 3 is then in the opening position (see FIGS. 2 and 3). The actuation of said shears is controlled by the arm 88 acting upon a second push-button 97 which by rendering the cam 29 (corresponding to the drum 3) rigid with the shaft 4 of the same drum 3 (by means which for the sake of simplicity are not shown) determines, by action of the cam, an action of the lever 30 upon the rod 22. Said cam 29 becomes rigid with the shaft 4 in a well-determined mutual position between the shaft and the cam. In practice, for instance, one can foresee an electromagnetically operated tooth 102 or a similar element of engagement which is connected by means of slip rings and brushes 103 and the push-button 97 to a network so that on closing said push-button 99, it tends to project from one of the two members for instance the shaft 44 to penetrate into a corresponding seat or opening provided in the other member, that is the cam 29, in such a way as to realize the engagement between said members in an exact mutual position thereof. When the control making the tooth to project has been effected, the tooth itself, in practice, will meet the surface of the other member, whence for a certain time it will not be able to advance and, at a certain time, it will meet (owing to the relative movement between the cam and the shaft) said seat, penetrating thereinto and, therefore, realizing the engagement in said well defined position mutually between the two members. By rotating the cam 29 in the thus fixed relative position with the shaft 4, the cam 29, acts upon the lever 30, which in turn acts upon the rod 22, the latter by shifting towards the left (if looking at FIG. 3) determines the lowering of the shears 28 which meets the tape 23 at the point P; at that time the recess 96 passes under said tape. Said shears is made in such a way as to cut off the tape while retaining, at the bottom of the recess, the end of said tape belonging to the portion arriving from the rolling mills while the end belonging to the tape forming the coil 74 on the drum 2 remains free and this free end is then fixed by a means whatsoever on said coil which thereby is finished.

On having performed the revolution, the cam 29 is automatically freed from the engagement with the shaft 4, for instance by interrupting the circuit between push-button 97 and member 102 by a time delay relay (not shown) and is stopped in its initial position while the shaft 4 continues to rotate. The lever 30 returns (for instance by action of an elastic means) to its rest position, namely detached from the rod 22; the shears 28 however remains lowered since the arm 36 (rigid with the arm 35) having been lifted (owing to the displacement of the axis 22 towards the left, if looking at FIG. 3), remains in lifted position by the small piston 38 against the action of the spring 39 tending to lower it.

Since the end of the tape 23 is retained in the recess 96 of the drum 3 which rotates in the direction of the arrow $F_3$ (marked in FIG. 2), the coiling of the tape is effected on this drum. From the above it appears that in practice it suffices that said condition of tangency of the tape 23 with the drum 3 is attained when the arm 88, by acting upon the push-button 97, starts the movement of the shears.

Then the stoppage of the drum 2 is controlled, for instance by means of a third push-button actuated by the arm 88; the two friction clutches are put in condition of not transmitting movement. Since oil penetrates into the chamber 52 there takes place a contact between the elements 56 and 56' whence the shaft 45 is braked; oil is sent also into the chamber 68.

On control by the operator, the diameter of the peripheral surface S of the drum 2 is reduced (by an amount relatively small); the drive member 21 (actuated by the operator by means of a push-button) displaces the member 19 and then the rod 18 towards the left (if looking at FIG. 3) whence the element 9 and the arms 10 displace the sectors 7 slightly in the direction in which they draw near to the centre: in that way the radius of the surface S of the drum 2 is reduced. Also on control of the operator, the arm 88 is displaced a little towards the left (if looking at FIG. 2).

The coil 74 is now free to be drawn off from the drum 2; the shears 28 in fact, even if lowered, does not tighten the tape against the surface of the drum. On control by the operator the ring 71 is advanced in the direction of the arrow $F_5$ (see FIG. 7) (the ring 71 being pushed by the rods 72) and said ring 71 draws the coil off said drum (the drum visible in FIG. 7, though indicated by 3) is quite equal to the drum 2 in question, and the device for drawing off the coil is equal for both drums. There are provided means (not shown for the sake of simplicity) to determine automatically, or on control by the operator, after the termination of said drawing-off operations, the return of the ring 71, and the return of the drum 2 to the conditions of maximum diameter of its surface S: thereafter is also controlled (for instance by the operator) the re-lifting of the shears 28 of the drum 2 in order to provide at a suitable time the starting of action of said shears. Said re-lifting of the shears is realized by controlling the lowering of the push-button 38 and therefore by permitting the spring 39 to act upon the lever 36. Now considering again the drum 3 in rotation, it will be appreciated, as explained above that the coiling of fresh tape on said drum continues. The arm 89 is at contact with the tape that winds up on the drum 3 (namely with the periphery of the coil in course of formation on said drum); said arm is put into action, namely it is brought to contact with the coil or bobbin, on control by the operator: owing to that contact, kept by elastic means or other, said arm rotates slowly in the direction of the arrow $F_6$, since the diameter of the coil 74 in the course of being formed keeps increasing. When the arm 89 presses the push-button 95, the tape 23 is tangent to the drum 2 at P' (see FIG. 1). The tangency with the drum 2 takes place during coiling on the drum 3. The displacement of the carriage 76, which stops at the end of stroke in the position visible in FIG. 1, is controlled by the operation. When the push-button 95 has been depressed, movements quite similar to those above described are effected. In particular, the drum 2 is set in motion, which a short time thereafter attains the speed of synchronism (peripheral speed equal to the speed of the tape 23); by effect of the second push-button 98, the shears 28 of the drum 2 starts action and therefore the formation of the new coil on said drum begins (which drum turns in the direction of the arrow $F_7$); the drum 3 is stopped (the free end of the tape is fixed to the coil 74 formed on the drum 3). The control of the starting of rotation of the drum 2 and of the actuation of the respective shears 28 are realized by means equivalent to those above described for the drum 3; in fact, as above, for each drum there are provided two friction clutches for the movement of said drum and members such as the cam 29, the lever 30 and associated members, for the control of the shears.

The same members as above described control the various movements for the drawing off of the coil 74 formed on the drum 3, namely the reduction of diameter of the drum, a displacement of the lever 89 (according to the arrow $F_6$) and the ejection of the coil 74 by the respective annular element 71. The tape, as above stated, is wound up in this stage on the drum 2 (the winding-up is started by the above cited action of the shears 2 at the point of tangency P'). At the end of the coiling on the drum 2, said tape will have to pass, as already stated above, on the drum 3, namely, at a certain time, the tape will have to be tangent at P to said drum 3, whence the carriage 76 must go to the right-side position to provide said condition of tangency (see FIG. 2).

The passage of the carriage is controlled by the operator who actuates the motor 86 of the carriage, by acting upon a special control while the tape is still winding up on the drum 2 (said control of the movement of the carriage may even be automatically); in the course of said displacement of the carriage 76 from the left-hand position (see FIG. 1) to the right-hand position (see FIG. 2), the pulley 75 moving with the carriage exerts a tension force upon said tape, there takes place a slipping of the friction clutches (which transmit the movement to the drum 2).

During passage of the carriage 76 from the position of FIG. 2 to the position of FIG. 1, for a certain speed of the carriage, there would accrue tape in excess between the pulley 75 and the drum 3; on the other hand, as said above, there is provided a slipping of friction clutches to keep constant the peripheral speed of the coil (the diameter of which increases during the coiling of the tape) whence said excess of tape does not form since the slipping of the friction clutches is reduced.

While the movements of the machine as above described continue in succession, portions of tape are coiled, by forming as many coils, alternately on the two drums 2 and 3: whereby a continuous coiling is obtained, without having to stop the feeding of the tape 23 coming from the rolling mills.

What is claimed is:

1. A machine for coiling continuously supplied tape comprising, in combination, support means; two drums on which portions of the continuously supplied tape are to be alternately coiled, said drums being rotatably mounted on said support means spaced from each other in a direction transverse to their axes; guide means over which the tape passes to one or the other of said drums, said guide means being mounted on said support means movable between two end positions in each of which a portion of the tape between said guide means and one drum on which said tape is coiled is tangent to the peripheral surface of the other drum when the diameter of the coiled tape on said one drum reaches a predetermined diameter; combined shearing and clamping means carried by each of said drums for rotation therewith and movable between an open position and a closed position cutting transversely through the tape and clamping the leading end of the tape on the respective drum; moving means for each of said combined shearing and clamping means for moving the same between said positions thereof; sensing means for each drum for sensing the diameter of the coil wound thereon, the sensing means of one drum cooperating with the moving means of the combined shearing and clamping means on the other drum to actuate said moving means, when the diameter of the coil on said one drum has reached said predetermined diameter, so as to move the combined shearing and clamping means on said other drum from said open to said closed position to cut the tape at the point of tangency with said other drum and to clamp the leading end of the cut tape to said other drum; and drive means for rotating said drums about their axes.

2. A machine as defined in claim 1, wherein said sensing means cooperates with said drive means to start rotation of said other drum and to rotate the same at a peripheral speed substantially equal to the linear speed of the continuously supplied tape when said sensing means senses a diameter of the coil on said one drum which is only slightly smaller than said predetermined diameter.

3. A machine as defined in claim 2, wherein said drive means comprises a single motor for said two drums, a pair of transmission means between said single motor and said two drums for transmitting a drive from said motor to the respective drum, each of said transmission means including clutch means movable between an engaged and a disengaged position, the sensing means of one drum cooperating with the clutch means of the transmission means of the other drum for moving said clutch means to said engaged position when said sensing means senses a diameter of the coil on said one drum which is only slightly smaller than said predetermined diameter.

4. A machine as defined in claim 3, wherein said clutch means are fluid-operated friction clutches.

5. A machine as defined in claim 3, wherein each of said transmission means includes brake means movable between an inactive position and a braking position, said sensing means cooperating with said brake means for moving the brake means of the transmission means of said one drum to said braking position after said sensing means has actuated said moving means for said combined shearing and clamping means on said other drum.

6. A machine as defined in claim 1, wherein each of said drums is fixedly mounted on a hollow shaft member for rotation therewith, and wherein said moving means for each combined shearing and clamping means comprises a rod extending coaxially through the respective hollow shaft member and being movable in axial direction with respect thereto, lever means between one end of said rod and said combined shearing and clamping means for moving the latter between said positions thereof during axial movement of said rod, a cam member freely turnably mounted on said shaft member, means to be actuated by said cam member and cooperating with said rod for axially moving the same from a starting position to an end position in which said combined shearing and clamping means are moved to said closed position, cooperating coupling means on said members and controlled by said sensing means for connecting said cam member to said shaft member for rotation therewith at an exact relative position to each other so that said cam member will move said combined shearing and clamping means to said closed position when said shearing and clamping means rotating with said other drum reaches the point of tangency between the tape and said other drum.

7. A machine as defined in claim 6, wherein said cooperating coupling means comprises an engagement tooth carried by one of said members and a corresponding seat provided in the other member, said engagement tooth being housed in the interior of said one member and adapted to project from the surface of said one member in contact with the surface of the other member so that on controlling the issue of said tooth by said sensing means, said tooth will enter into said seat only when the latter passes during relative movement of said members in registry with said tooth so as to couple said two members for rotation with each other in said exact relative position thereof.

8. A machine as defined in claim 1, wherein each drum comprises a plurality of sectors movable radially in such a way so as to vary the diameter of the drum, and including control means cooperating with said sectors to displace the latter in a direction in which the diameter of said one drum is reduced after the tape has been cut by the combined shearing and clamping means of the other drum so as to permit easy drawing-off of the coil from said one drum, said control means being constructed to return said sectors to a position of maximum diameter after the coil has been drawn off therefrom.

9. A machine as defined in claim 8, wherein each of said drums is fixedly mounted on a hollow shaft member for rotation therewith, and wherein said control means for each drum comprise a rod extending longitudinally through the drum carrying shaft member movable in axial direction thereof, means cooperating with one end of said rod and with said sectors for moving the latter in radial outward direction during displacing of the rod in one direction and for moving said sectors in radial inward direction during displacing of the rod in the opposite direction, and moving means connected to the other end of said rod for moving the latter in said one and in said opposite direction.

10. A machine as defined in claim 9, and including means for each drum for ejection of the coil thereon and comprising an annular element coaxial with the respective drum and of an internal diameter larger than the minimum external diameter of the drum, and moving means cooperating with said annular element for moving the same in axial direction of the drum so as to push the coil thereon off the drum after the diameter of the drum has been reduced to said minimum diameter.

11. A machine as defined in claim 10, and including brake means for each drum movable between an inactive position and a braking position stopping rotation of the respective drum, and sensing means cooperating with said brake means for moving the brake means of the one drum to said braking position after said sensing means has actuated said moving means for said combined shearing and clamping means on said other drum, and means for automatically moving said rod of said control means of said one drum in said opposite direction to reduce the diameter of said one drum and to actuate the moving means for said annular element of said drum for moving said annular element on said one drum in axial direction of the latter so as to push the coil therefrom.

12. A machine as defined in claim 2, wherein said sensing means comprises lever means for each drum pivoted at one end thereof to said support means and contacting at the other end thereof the periphery of the coil wound on the respective drum, so that said lever means is angularly displaced as the diameter of the coil increases, and two push buttons fixedly mounted on said support means in positions to be successively operated during angular displacement of said lever means, one of said push buttons being mounted on said support means in a position to be actuated when the diameter of the coil on one drum is only slightly smaller than said predetermined diameter, and said one push button, when actuated, cooperating with said drive means to start rotation of said other drum, and the other of said push buttons being mounted on said support means in a position to be actuated when the diameter of said coil reaches said predetermined diameter, said other push button, when actuated, cooperating with the moving means of the combined shearing and clamping means on the other drum to move the combined shearing and clamping means to said closed position when the diameter of the coil on said one drum reaches said predetermined diameter.

13. A machine as defined in claim 1, wherein said drums are spaced in substantially horizontal direction from each other and wherein said guide means for the tape comprises a carriage movable on a substantially horizontal guide, a roll over which the tape passes turnably carried by said carriage, and means cooperating with said carriage for moving the same between said two end positions.

References Cited

UNITED STATES PATENTS

| | | | |
|---|---|---|---|
| 1,825,657 | 10/1931 | Dukes | 242—78.1 |
| 2,161,076 | 6/1939 | Morgan | 72—146 |
| 2,357,389 | 9/1944 | Ferm | 242—80 |
| 2,449,234 | 9/1948 | Knoble | 242—80 |
| 2,786,638 | 3/1957 | Fullerton | 242—80 |

FOREIGN PATENTS

| | | |
|---|---|---|
| 484,525 | 12/1952 | Canada. |

CHARLES W. LANHAM, *Primary Examiner.*

RICHARD J. HERBST, *Examiner.*

A. RUDERMAN, *Assistant Examiner.*